Feb. 25, 1969         R. P. JONES         3,429,521
FISHING REEL WITH SPRING CLUTCH
Filed Dec. 27, 1965
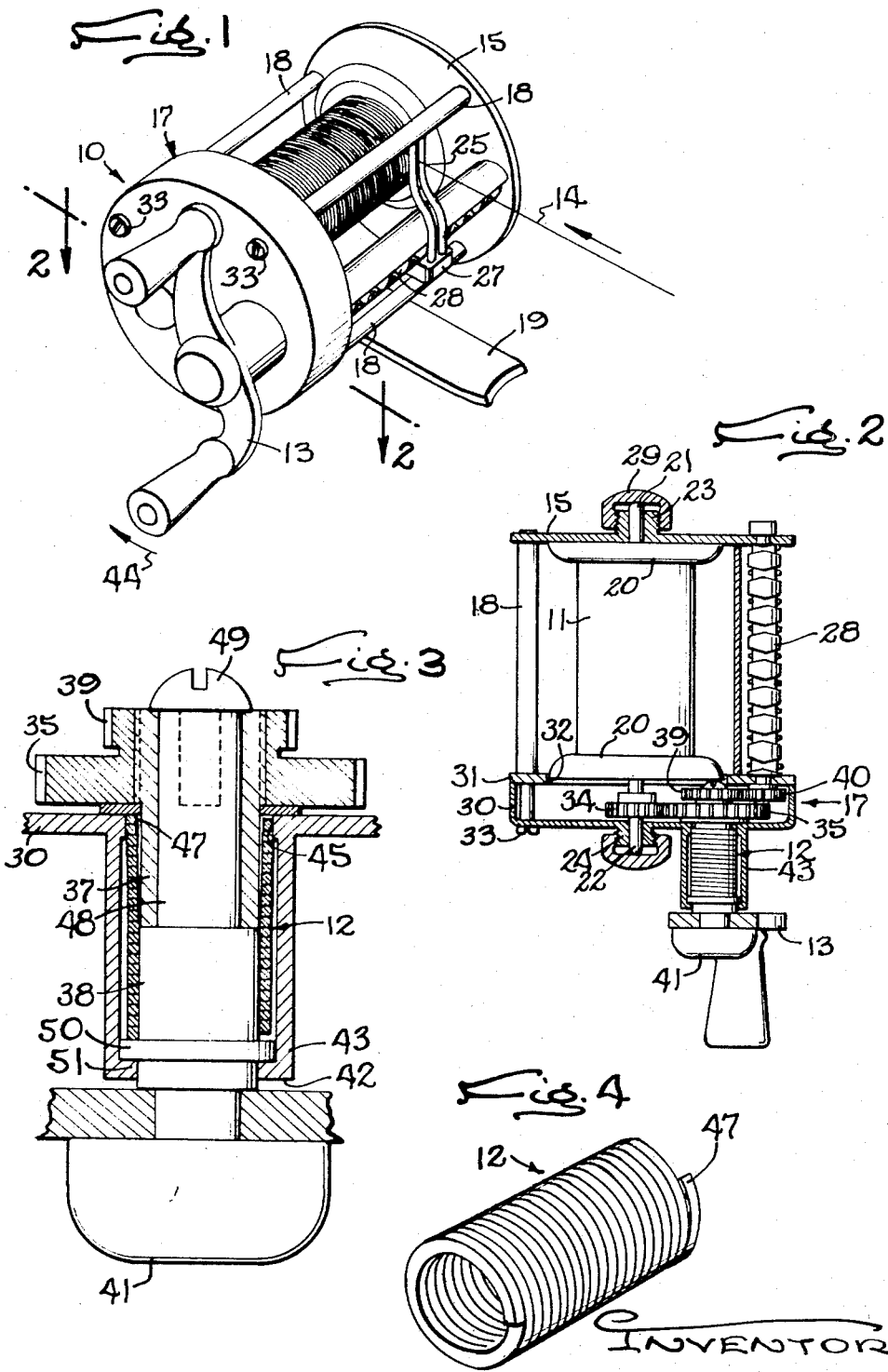
INVENTOR
Richard P. Jones
by Wolfe, Hubbard, Voit & Osann
ATTORNEY United States Patent Office 3,429,521
Patented Feb. 25, 1969

3,429,521
FISHING REEL WITH SPRING CLUTCH
Richard P. Jones, 625 N. Winnebago,
Rockford, Ill. 61103
Filed Dec. 27, 1965, Ser. No. 516,308
U.S. Cl. 242—84.54     5 Claims
Int. Cl. A01k 89/00; F16d 41/00

ABSTRACT OF THE DISCLOSURE

A casting reel having a spool rotatably mounted on a reel frame with the usual level-wind mechanism on the frame and gearing acting between a hand crank and both the spool and the level-wind mechanism to operate the reel. The crankshaft carries a coiled spring which is telescoped loosely over a drive shaft carrying the input gear of the gearing so that the drive shaft, and thus the spool, normally are rotatable substantially freely relative to the spring and the crank. Disposed around the end portion of the spring encircling the drive shaft is an internal bearing surface formed by a fixed portion of the frame which is in frictional engagement with the outside of the spring, thereby causing the spring to contract into gripping engagement with the shaft only when the crank and the adjacent end of the spring are turned relative to the frame.

---

This invention relates to a free-spooling fishing reel having a hand crank selectively coupled to a take-up member such as a spool to rotate the take-up member in a direction to retrieve the line, and relates more particularly to a coiled spring clutch telescoping with two end-to-end shafts in such a reel to be stressed into clutching engagement with one of the shafts in response to rotation of the other shaft, the spring being mounted to rotate with the first shaft and to permit substantially free rotation of the other shaft relative to the spring in at least one direction.

The general object of the present invention is to provide a new and improved free-spooling fishing reel of the foregoing character having a spring clutch of simplified construction and mounting.

A more detailed object is to prevent or retard rotation of the clutching end of the spring with the driven end in a novel manner which eliminates the need for retaining lugs, positive locks and other prior art devices, and instead produces the clutching action with a simple friction drag applied to the side of the spring remote from the shaft to be clutched.

Another object is to form and mount the spring in a novel manner for substantially free turning of one shaft in both directions relative to the spring and for effective clutching when the other shaft is turned in one direction to initiate a retrieve.

Still another object is to support the clutched shaft on the reel frame in an extremely simple manner relative to the other shaft and the spring clutch.

Other objects and advantages of the invention will become apparent from the following detailed description taken in connection with the accompanying drawings, in which:

FIGURE 1 is a perspective view of a reel embodying the novel features of the present invention.

FIG. 2 is a cross-sectional view taken substantially along the line 2—2 of FIG. 1.

FIG. 3 is an enlarged fragmentary view similar to part of FIG. 2 with additional parts shown in section.

FIG. 4 is an enlarged perspective view of the spring clutch.

As shown in the drawings for purposes of illustration, the invention is embodied in a so-called free-spooling casting reel 10 having a spool 11 (FIG. 2) rotatably mounted on the reel frame and adapted to be drivingly connected by a clutch 12 to a handcrank 13 for turning the spool in a direction to retrieve the line 14 after a cast, clockwise as viewed in FIG. 1. During casting, the clutch is disengaged to released the spool from the crank and reduce the inertia of the spool at the beginning and end of the cast for increased casting distance and less difficulty with backlashes.

In such reels, the frame comprises a pair of end pieces 15 and 17 at the opposite ends of the spool joined together by several pins 18 angularly spaced around the spool and fastened to the end pieces. Fast on two of the pins on the underside of the reel (as viewed in FIG. 1) is a mounting plate 19 with which the reel is secured to a casting rod (not shown).

As shown in FIG. 2, the spool 11 comprises a cylindrical body on which the line 14 is wound between two flanges 20 on the opposite ends of the body. Coaxial shafts 21 and 22 project outwardly from the ends of the spool and are journaled in bearings 23 and 24 (FIG. 2) in the end pieces to mount the spool rotatably on the frame. The reel also has the usual level-wind mechanism including a guide 25 slidably supported at its upper end in a longitudinal groove in one of the pins 18 and carried at its lower end on a nut 27 which travels back and forth along a screw 28 as the spool turns, thereby distributing the line uniformly across the spool.

Herein, the end piece 15 is simply a disk with the bearing 23 fast on its outer side and closed by a cap 29 threaded onto the bearing, and the other end piece 17 is formed by a cup-shaped cover 30 fastened to a second disk 31 having a circular center hole 32 through which the spool shaft 22 projects, the connecting pins 18 being riveted to the disk 15 and fastened to the other disk by screws 33 which also hold the cover in place. The bearing 24 is secured to the outer wall of the cover, and the gearing for rotating the spool 11 and operating the level-wind is housed in the cover. This gearing includes a pinion 34 on the shaft 22 meshing with a larger gear 35 on the inner end portion of a drive shaft 37 adapted to be driven through the clutch 12 by the output shaft 38 of the hand crank 13. The drive shaft also carries a gear 39 meshing with another gear 40 on the end of the traversing screw 28 to turn the latter with the spool. The crank is in the usual form non-rotatably secured to the outer end of its shaft and held thereon by a nut 41 adjacent the outer end 42 of a sleeve 43 fastened at its inner end to the cover 30 and forming a housing for the clutch 12.

As shown most clearly in FIG. 3, the crank shaft 38 and the drive shaft 37 are disposed in end-to-end relation and the clutch 12 is a helically coiled spring having one end portion telescoped over the crank shaft and its opposite end portion telescoped over the drive shaft to contract about the latter and couple the two shafts together for rotation of the spool with the hand crank 13 in one direction of turning of the latter. While such clutches have been known in general, the present invention resides in the improved and simplified manner of supporting the spring clutch relative to the shafts, maintaining the inner end portion of the spring in so-called open condition for free rotation of the spool 11 during casting, and causing the spring to contract into clutching engagement with the drive shaft in response to manual turning of the crank in one direction, clockwise in this instance as indicated by the arrow 44 in FIG. 1.

To these ends, a simple bearing surface 45 is provided on the frame to engage the surface of the inner end portion of the spring 12 remote from the drive shaft 37 and exert a frictional drag resisting rotation of this end portion with the outer end portion as the latter turns with the crank 13, thereby causing stressing of the spring into engagement with the drive shaft when the crankshaft 38 turns in the direction to wind up the spring. The inner end portion is formed with a turn 47 that is sprung away from the remainder of the coil and stressed toward the drive shaft by the bearing surface to loosen the fit with the drive shaft while increasing the frictional griping of the spring by this surface. Accordingly, the clutch and its related parts are of relatively simple construction, permit free rotation of the drive shaft in both directions with the spool, and operate positively to couple the shafts 37 and 38 together when the crank is turned clockwise to retrieve the line.

In this instance, the drive shaft 37 is a hollow sleeve and the crank shaft 38 is a cylindrical piece having an outside diameter slightly larger than the outside diameter of the sleeve and also having an elongated coaxial shank 48 extending through the sleeve with a screw 49 threaded into its inner end and holding the gears 35 and 39 on the sleeve. Encircling the outer end of the crankshaft is an annular rib 50 journaled in the inside wall of the clutch housing 43 and abutting against an inturned locating flange 51 at the outer end of the latter. With this arrangement, the drive shaft is rotatably supported on and positioned by the crankshaft.

The spring 12 is telescoped over both shafts and is composed of spring wire of rectangular cross-section providing optimum surface area for engagement with the respective shafts, and is coiled to a relaxed inside diameter providing a snug fit on the crankshaft 38 and a slightly looser fit on the drive shaft 37 permitting the latter to turn relatively freely at least in one direction. It will be seen in FIG. 3 that the inside diameter of the housing 43 is substantially greater than the outside diameter of the spring, and that the bearing surface 45 is a cylindrical wall encircling the inner end turns of the spring and formed on an inwardly extending annular rib defining the circular opening at the inner end of the clutch housing. This opening is sized to receive the inner end of the spring with a snug fit so that the wall 45 frictionally grips the outside surface of the spring.

As shown in FIG. 4, the free inner end portion 47 of the spring wire is sprung outwardly in the relaxed or free condition of the spring. When this end is pressed into the bearing opening, the inward stressing of the spring wire tends to unwind several adjacent convolutions of the wire to a limited extent as illustrated in FIG. 3, thereby loosening the fit of the spring around the drive shaft for substantially free rotation of the latter in both directions within the spring. Thus, when the hand crank is stationary, the spool 11 may turn in both directions. It should be noted that a light touching engagement between the spring and the drive shaft can be desirable for its effect in reducing the tendency of the spool to overrun at the end of a cast. The driving of the level-wind by the spool has the same effect.

Of course, counterclockwise rotation of the hand crank 13 as viewed in FIG. 1 tends to open the spring 12 rather than contract it, and thus does not operate the clutch. As the hand crank is turned clockwise during a retrieve or while playing a fish, the initial turning of the outer end portion of the spring with the crankshaft 38 while the inner end portion is frictionally held or retarded by the bearing surface 45 causes contraction of the spring to tighten its grip on the crankshaft and to bring the inner end portion into clutching engagement with the drive shaft thereby coupling the spool drive to the hand crank and turning the spool in a direction to retrieve the line. The clutching action begins adjacent the crankshaft and increases progressively toward the inner end as successive turns contract into engagement with the drive shaft. In playing a fish with this reel, it is possible to vary the force on the hand crank and exert a selectively variable drag on the drive shaft permitting the fish to strip out line against a selected holding force.

From the foregoing, it will be seen that the spring clutch 12 and its associated parts are formed, mounted and operated in a simple manner which makes the clutch mechanism relatively inexpensive in construction without hampering the effectiveness of the clutch. The drive shaft is supported in a simple manner around the shank 48 and within the spring and the latter is actuated by the bearing surface 45 around its inner end simply exerting a frictional drag on the inner end portion.

It will be evident to those skilled in the art that modifications in form may be made without departing from the present invention. For example, the spring coil 12 may be tapered toward its outer end to provide clearance around the drive shaft 37, and could be telescoped into two hollow shafts to expand rather than contract into clutching engagement with the drive shaft in response to a frictional drag applied to the inner side of the spring.

I claim as my invention:

1. A fishing reel having, in combination, a frame, a storage spool for holding a supply of line rotatably supported on said frame and adapted to wind up the line during rotation of the spool in a take-up direction, a drive shaft journaled on said frame and drivingly connected to said spool to rotate the spool and to rotate therewith, a hand crank rotatably supported on said frame and having an output shaft disposed in end-to-end relation with said drive shaft, a helically coiled spring having one end portion telescoped over and secured to said output shaft for rotation therewith and its opposite end portion telescoped loosely over said drive shaft with a close fit to permit substantially free rotation of the drive shaft with said spool and relative to the output shaft upon rotation of the spool, and an uninterrupted and radially facing bearing surface extending around said opposite end portion and frictionally engaging a radially outwardly stressed turn of said opposite end portion, said bearing surface being fixed relative to said frame to exert a drag resisting rotation of said opposite end portion with said one end portion and said output shaft thereby to cause contraction of said opposite end portion into clutching engagement with said drive shaft upon rotation of said output shaft in one direction and thus couple the hand crank to said spool.

2. The combination defined in claim 1 in which said spring is formed with a free inside diameter snugly fitting said output shaft and with a turn inside said bearing surface extending outwardly from said coil and engaging the bearing surface, said turn being stressed inwardly by said bearing surface to unwind several adjacent turns of said spring and thereby loosen the fit of said opposite end portion around said drive shaft.

3. The combination defined in claim 1 in which said bearing surface is the wall of a circular opening in said frame in which said opposite end portion is disposed.

4. The combination defined in claim 3 in which said spring is formed with an end turn disposed within said opening and sprung outwardly to extend beyond the remainder of the spring and increase the diameter of the spring to a size greater than the size of said opening.

5. The combination defined in claim 1 in which said drive shaft is a hollow sleeve having a cylindrical inside surface, and said output shaft is formed with a coaxial shank extending into said sleeve and journaling the latter on said frame.

References Cited

UNITED STATES PATENTS

| | | | |
|---|---|---|---|
| 1,987,713 | 1/1935 | Scott | 242—84.44 |
| 2,622,450 | 12/1952 | Gorske et al. | 192—41 X |
| 2,918,227 | 12/1959 | Mauborgne | 242—84.21 |
| 2,984,325 | 5/1961 | Tomko et al. | |
| 3,116,893 | 1/1964 | Wood | 242—84.54 X |
| 3,175,781 | 3/1965 | Maury et al. | 242—84.2 |

FOREIGN PATENTS 896,650  5/1962  Great Britain.

BILLY S. TAYLOR, *Primary Examiner.*

U.S. Cl. X.R.

192—41